US009683615B2

(12) United States Patent
McCabe et al.

(10) Patent No.: US 9,683,615 B2
(45) Date of Patent: Jun. 20, 2017

(54) INPUT CLUTCH ASSEMBLY

(71) Applicant: FORD GLOBAL TECHNOLOGIES, LLC, Dearborn, MI (US)

(72) Inventors: Flynn McCabe, Allen Park, MI (US); Dionna Sharpe, Canton, MI (US); John D. Borders, Fraser, MI (US); Patrick Duff, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 14/868,668

(22) Filed: Sep. 29, 2015

(65) Prior Publication Data

US 2017/0089407 A1    Mar. 30, 2017

(51) Int. Cl.

| F16D 25/12 | (2006.01) |
|---|---|
| F16D 25/06 | (2006.01) |
| F16D 125/06 | (2012.01) |
| F16D 121/04 | (2012.01) |
| F16D 1/06 | (2006.01) |
| F16D 1/10 | (2006.01) |

(52) U.S. Cl.
CPC ............. *F16D 25/12* (2013.01); *F16D 25/06* (2013.01); *F16D 1/06* (2013.01); *F16D 1/10* (2013.01); *F16D 2001/103* (2013.01); *F16D 2121/04* (2013.01); *F16D 2125/06* (2013.01)

(58) Field of Classification Search
None
See application file for complete search history.

(56) References Cited

U.S. PATENT DOCUMENTS

| 5,527,126 A | 6/1996 | Digel et al. |
|---|---|---|
| 6,044,946 A | 4/2000 | Makino et al. |
| 2014/0112697 A1 | 4/2014 | Harmon et al. |
| 2015/0016873 A1 | 1/2015 | Larson |

FOREIGN PATENT DOCUMENTS

JP        2009250339        10/2009

*Primary Examiner* — Jacob S Scott
*Assistant Examiner* — Timothy M Hannon
(74) *Attorney, Agent, or Firm* — James Dottavio; Brooks Kushman P.C.

(57) ABSTRACT

The present invention in one or more embodiments provides an input clutch assembly which includes a cylinder housing, a cross-section thereof including along an axial direction first and second spaced apart cylinder-portions, and an input sleeve, a cross-section thereof including along the axial direction first and second sleeve-portions defining therebetween a first sleeve-channel with a pair of edges spaced apart along the axial direction, the first sleeve-portion defining thereupon a recess, where at a first engagement position the recess is at least partially exposed while the pair of edges both contact the first cylinder-portion.

20 Claims, 4 Drawing Sheets

INPUT CLUTCH ASSEMBLY

TECHNICAL FIELD

The present invention relates to an input clutch assembly such as an input clutch assembly including an input or turbine shaft and a clutch or cylinder housing employed in an automotive setting.

BACKGROUND

Transmission turbine shaft or sleeves to clutch cylinders are often employed to transfer torque creating a mechanical coupling between an input shaft or sleeve and a corresponding clutch or cylinder housing. The sleeve often contains oil passages that feed oil to various clutches within the clutch or cylinder housing. In the process of leading to a full press depth engagement between the sleeve and its corresponding shaft or cylinder housing, cutting splines are employed to ensure mechanical coupling engagement. However, metal debris or contamination from the spline-cutting may result unfavorably in a desirably contamination-free area.

Publication U.S. 2014/0112697A1 discloses a chip or debris contamination trap to retain metal chips, fragments and other debris generated when a serrated or splined edge shaft or sleeve, press fit connection is assembled between a shaft or sleeve and a receiving structure such as a housing, a cylinder, a gear, a pulley or a bearing.

SUMMARY

In one or more embodiments, an input clutch assembly includes a cylinder housing, a cross-section thereof including along an axial direction first and second spaced apart cylinder-portions, and a shaft, a cross-section thereof including along the axial direction first and second sleeve-portions defining there-between a first sleeve-channel with a pair of edges spaced apart along the axial direction, the first sleeve-portion defining thereupon a recess, where at a first engagement position the recess is at least partially exposed while the pair of edges both contact the first cylinder-portion.

The second sleeve-portion may be of a second axial length along the axial direction and may contact the first cylinder-portion in more than half of the second axial length at the first engagement position.

The first sleeve-portion may include a pair of shoulders abutting the recess and contacting the first cylinder portion at a second engagement position.

The second sleeve-portion may be spaced apart from the first cylinder-portion at the second engagement position.

The pair of shoulders may be relative to each other with a radial dimension difference of no greater than 0.24 millimeters.

The cylinder housing may further include a stop extending radially toward a central axis, the second cylinder-portion being positioned between the stop and the first cylinder-portion along the axial direction.

A contact portion of the input sleeve may contact the stop at a third engagement position, the second sleeve-portion being positioned between the contact portion and the first sleeve-portion along the axial direction.

The cylinder housing may further include a third cylinder-portion spaced apart from the second cylinder-portion and a fourth cylinder-portion spaced apart from the third cylinder-portion, such that the third cylinder-portion is positioned between the second and fourth cylinder-portions along the axial direction, and the stop is part of the fourth cylinder-portion.

The input sleeve may further include a third sleeve-portion spaced apart from the second sleeve-portion and a fourth sleeve-portion spaced apart from the third sleeve-portion, such that the third sleeve-portion is positioned between the second and fourth sleeve-portions along the axial direction, and the contact portion is part of the fourth sleeve-portion.

The recess may be of an axial dimension along the axial direction and a radial dimension along a radial direction, the axial dimension being greater than the radial dimension.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein.

DETAILED DESCRIPTION OF ONE OR MORE EMBODIMENTS

Figure 1:
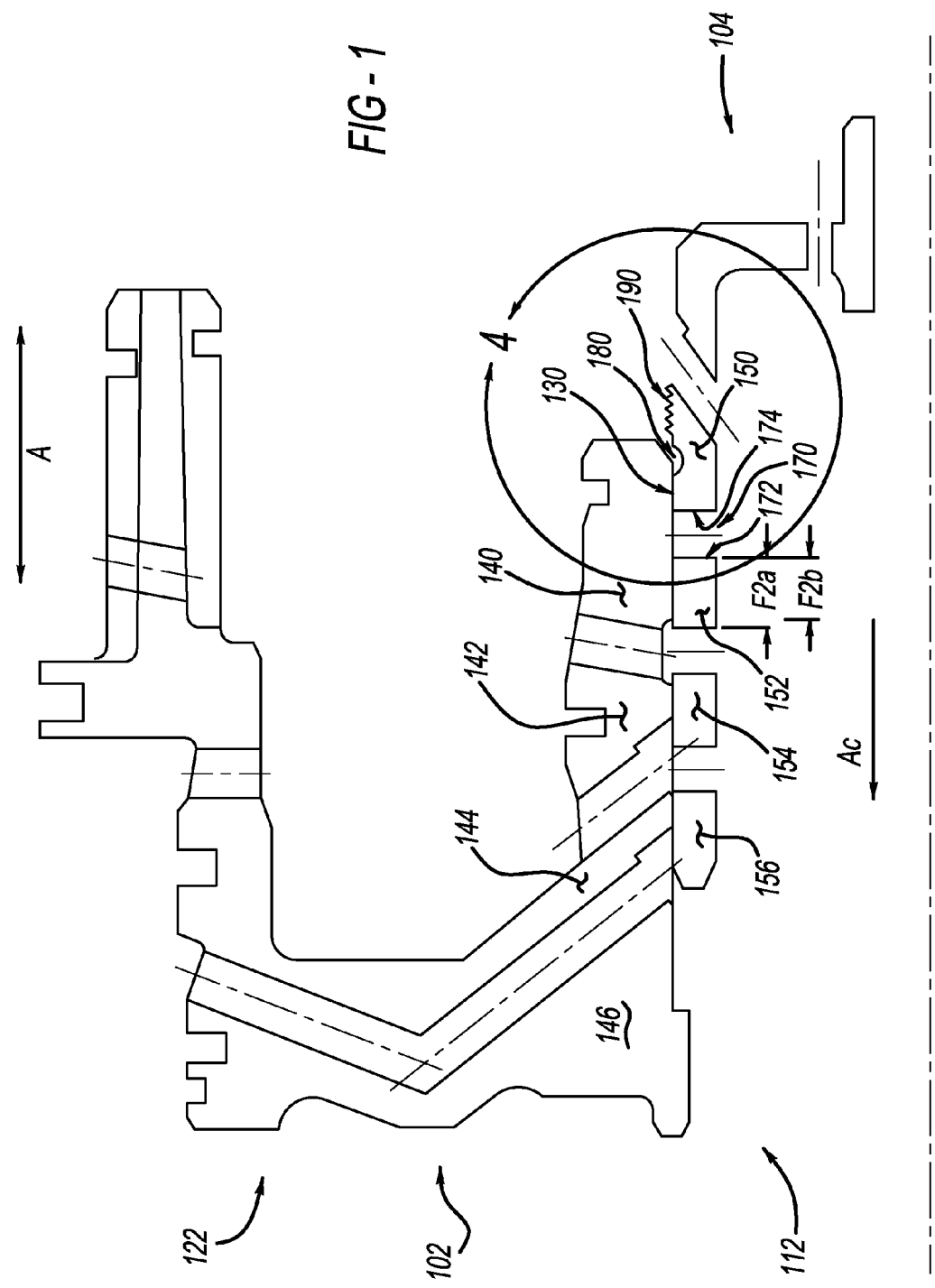
FIG. 1 illustratively depicts an input clutch assembly according to one or more embodiments at a first engagement position.

As referenced in the FIG.s, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present invention in one or more embodiments is believed to be advantageous in providing an input clutch assembly where an assembly process may involve relatively reduced amount of machining for confinement of metal debris that may otherwise be released undesirably into hydraulic passages nearby, while machining required to achieve the reduction in metal debris release may be kept at a favorable minimum. Accordingly labor and operational efficiencies may be desirably obtained.

Figure 2:
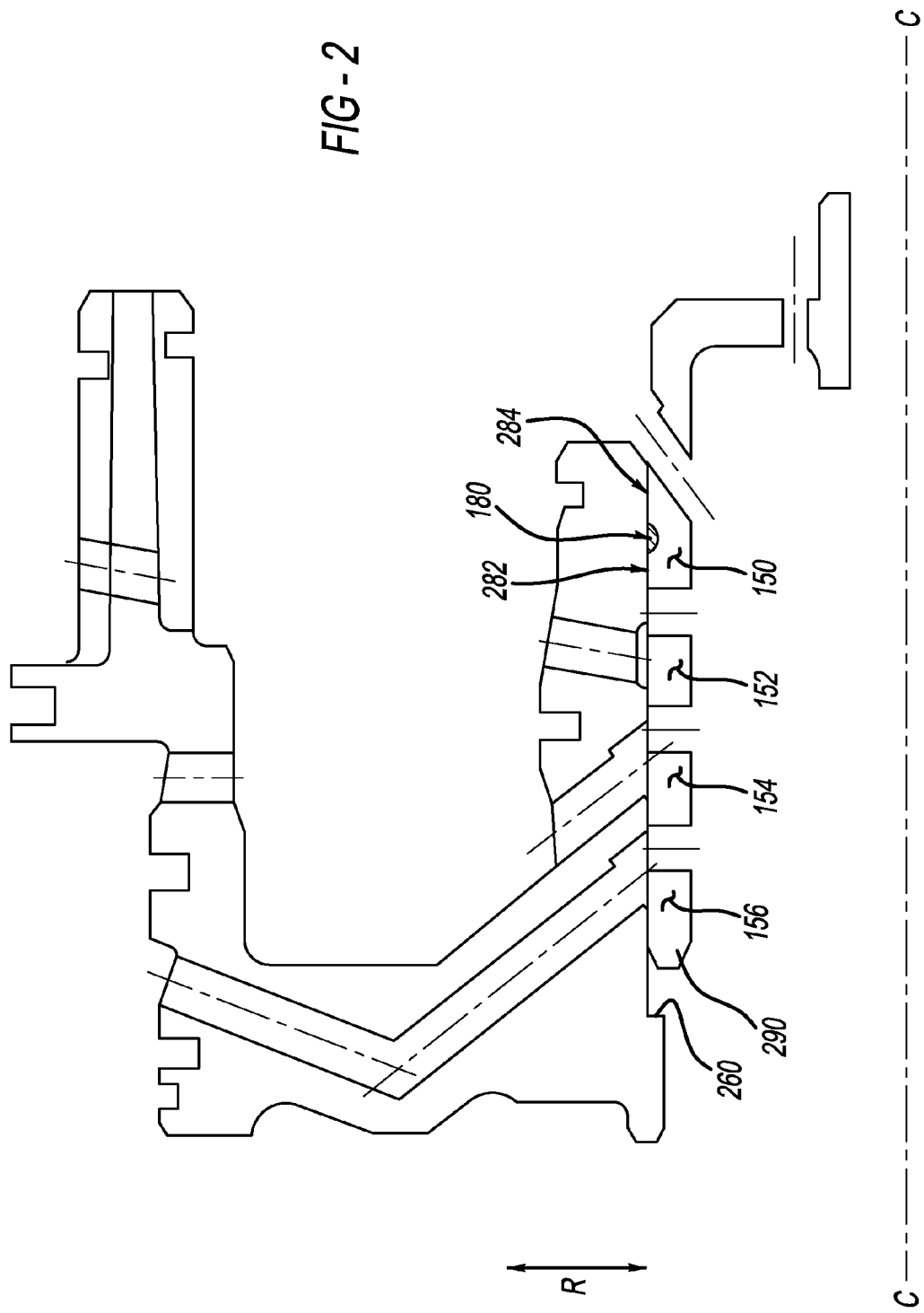
FIG. 2 illustratively depicts the input clutch assembly referenced in FIG. 1 at a second engagement position.
Figure 3:
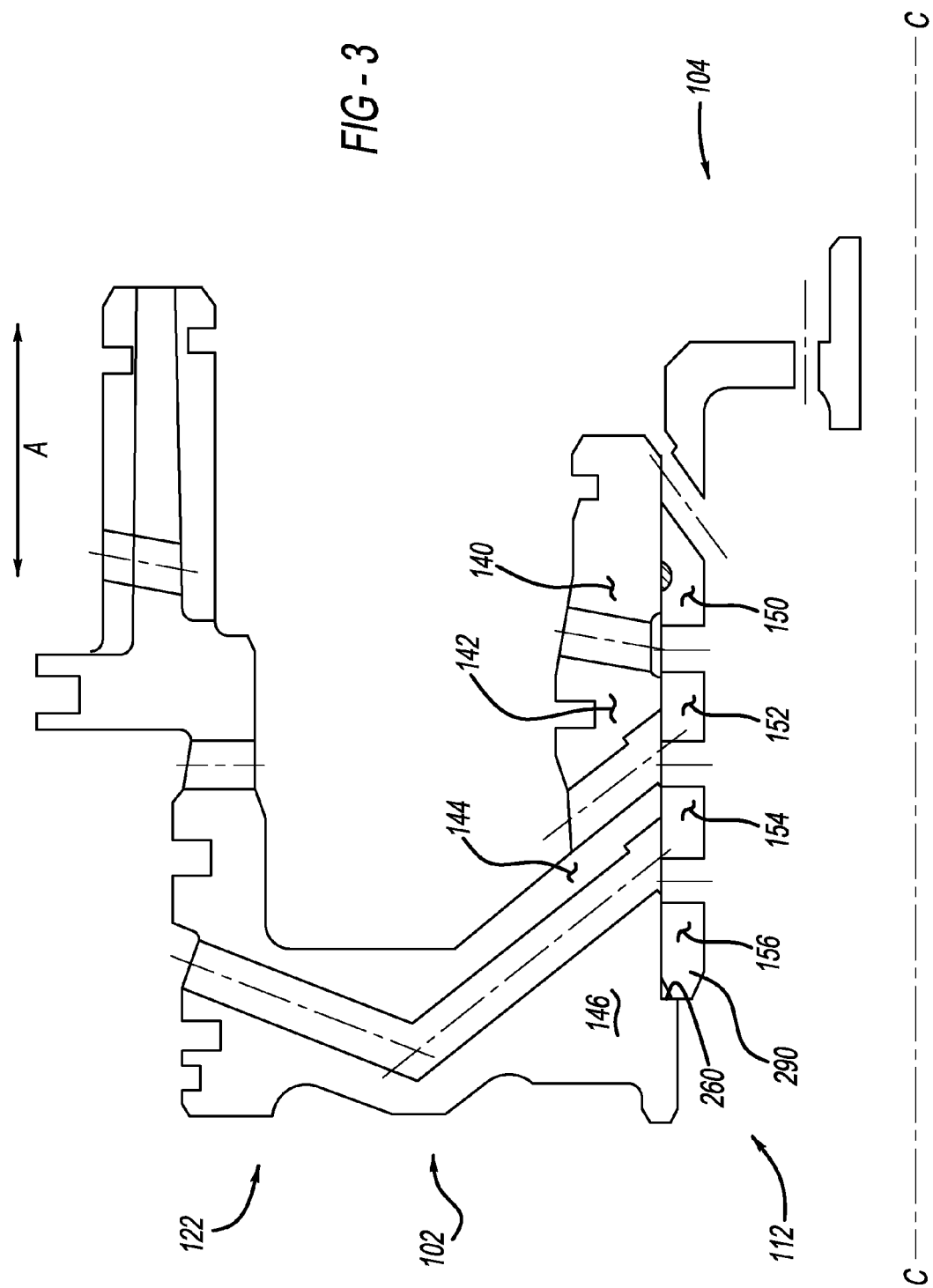
FIG. 3 illustratively depicts the input clutch assembly referenced in FIG. 1 and/or FIG. 2 at a third engagement position.

In one or more embodiments, and in view of FIG. 1 through FIG. 3, an input clutch assembly 100 includes a cylinder housing 102, a cross-section thereof including along an axial direction A first and second spaced apart cylinder-portions 140, 142, and an input sleeve 104, a cross-section thereof including along the axial direction A first and second sleeve-portions 150, 152 defining there-between a first sleeve-channel 170 with a pair of edges 172, 174 spaced apart along the axial direction A, the first sleeve-portion 150 defining thereupon a recess 180, where at a first engagement position such as the position illustratively depicted in FIG. 1, the recess 180 is at least partially exposed while the pair of edges 172, 174 both contacting the first cylinder-portion 140. The word "exposed" refers to the configuration that the recess 180 at this first engagement position has not yet been overlaid or covered by a wall 130 of the first cylinder-portion 140

In the first engagement position illustratively depicted in FIG. 1, the edges 172, 174 both contact the first cylinder-portion 140 while the recess 180 is at least partially exposed and therefore not yet completely received into the central bore 112 of the cylinder housing 102. This configuration is believed to reflect a favorable discovery that there does not need to be any intentionally employed gaps between the first cylinder-portion 140 and the pair of first and second sleeve-portions 150, 152. In other words, as long as cutting splines 190 positioned behind the recess 180 along the axial direction A may proceed along a cutting direction Ac, metal debris may be collected into the recess 180 and may not escape into the first sleeve-channel 170 due to the lack of any intentionally employed gaps proceeding the recess 180 along the cutting direction Ac.

Referring back to FIG. 1, at the first engagement position, the second sleeve-portion 152 may be of a second axial length F2a along the axial direction A and a portion F2b of the second axial length F2a may contact the first cylinder-portion 140, where the portion F2b may be greater than 50 percent of F2a. In other words, the second sleeve-portion 152 contacts the first cylinder-portion 140 in more than half of the second axial length F2a at the first engagement position. This configuration helps to ensure further that no gaps are intentionally created between the first cylinder-portion 140 and the pair of the first and second sleeve-portions 150, 152 at one of the initial engagement positions such as the first engagement position shown in FIG. 1.

Figure 4:
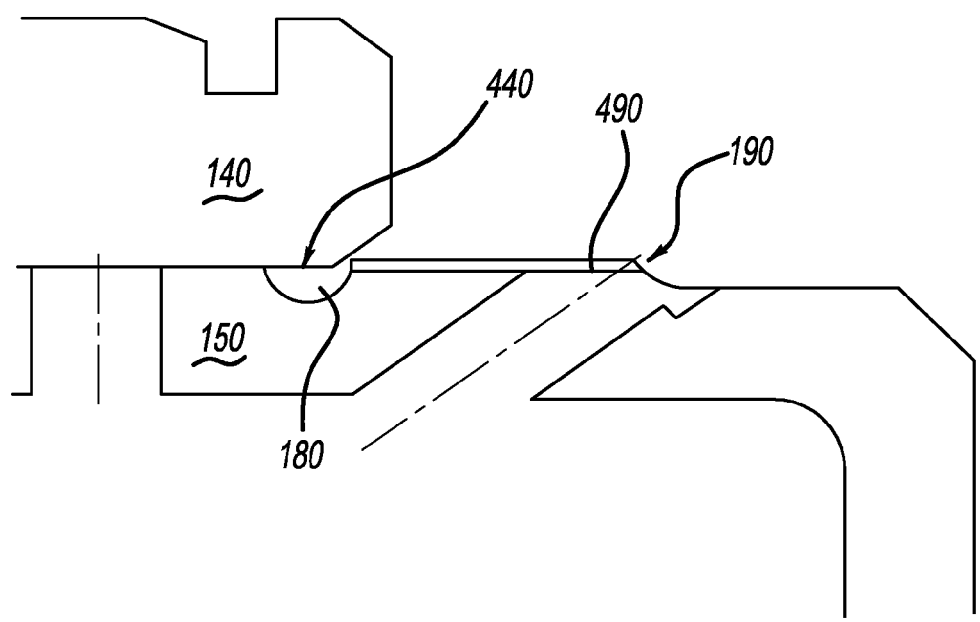
FIG. 4 illustratively depicts an enlarged view of a portion of the input clutch assembly referenced in FIG. 1.

An enlarged view of a portion in circle of the input clutch assembly 100 referenced in FIG. 1 is illustratively depicted in FIG. 4. To keep any possible gaps between the first cylinder-portion 140 and the first sleeve-portion 150 at a practically reasonable minimum, a minor diameter 490 of the cutting splines 190 is to be designed to be as close in value as possible relative to a preceding press fit diameter 440 of the first cylinder-portion 140. To facilitate proper functions of the spline cutting 190, the two diameters 440, 490 are not and cannot exactly be the same, as there does need to be a small amount of clearance between these two diameters for the spline teeth of the cutting splines 190 to cut properly. The difference is made small enough so that unwanted metal chips and debris may not travel back down through the clearance. Even with this small clearance, the edges 172, 174 are designed and expected to contact the first cylinder-portion 140 and in particular the wall 130 thereof at this first engagement position.

In certain embodiments, the shoulders 282, 284 are positioned relative to each other with an unavoidable radial dimension difference of no greater than 0.24 inches, 0.2 inches, 0.15 inches or 0.1 inches. This configuration is believed to make sure any unavoidable radial dimension difference between the shoulders 282, 284 is small enough not to encourage unwanted movement of debris into areas such as the channel 170.

Referring back to FIG. 2, which illustratively depicts a second engagement position, where the input sleeve 104 has travelled a distance along the cutting direction Ac from the first engagement position referenced in FIG. 1. At the second engagement position, shoulders 282, 284 that abut the recess 180 are shown to contact the first cylinder portion 140. As mentioned herein, the shoulder 284 may be positioned next to the cutting splines 190. In this scenario, the cutting splines 190 have conditioned the first cylinder-portion 140 with the spline-cutting along the cutting direction Ac, and therefore the shoulder 284 along with the shoulder 282 is reasonably expected to contact the first cylinder-portion 140. The debris created by the cutting splines at this engagement position is trapped and at least designed and expected to be trapped within the recess 180 against the wall 130 of the first cylinder-portion 140, with the shoulders 282, 284 being in reasonably good contacting position relative to the wall 180 such that any clearance there-between would be small enough not to allow the collected debris to unwantedly move into the channel 170.

Referring back to FIG. 2, the second sleeve-portion 152 may be spaced apart from the first cylinder-portion 140 at the second engagement position. This may result after the second sleeve-portion 152 continues to translate down along the axial direction as the cutting-splines 190 proceed along the cutting direction Ac.

Referring back to FIG. 2 and further in view of FIG. 3, the cylinder 102 may further include a stop 260 extending radially along radial direction R toward a central axis C-C, the second cylinder-portion 142 being positioned between the stop 260 and the first cylinder-portion 140 along the axial direction A.

The stop 260 may be employed to signal a fully engaged position, such as the third engagement position illustratively depicted in FIG. 3, where a contact portion 290 of the input sleeve 104 comes in contact with the stop 260 and no further translation along the axial direction may occur beyond this point. As illustratively depicted in FIG. 3, at the third engagement position, the second sleeve-portion 152 is positioned between the contact portion 290 and the first sleeve-portion 150 along the axial direction A.

By extending toward the central axis C-C and being positioned relatively close to a bottom end 122 of the cylinder housing 102, the stop 260 is advantageously provided such that any avoidable gaps along the radial direction R may be kept as a practically reasonable minimum without any unwanted interference from the stop engagement between the stop 260 and the contact portion 290.

Referring back to FIG. 1, the cylinder housing 102 may further include a third cylinder-portion 144 spaced apart from the second cylinder-portion 142, and a fourth cylinder-portion 146 spaced apart from the third cylinder-portion 144, such that the third cylinder-portion 144 is positioned between the second and fourth cylinder-portions 142, 146 along the axial direction A. In this configuration, the stop 260 may be part of or independent from the fourth cylinder-portion 146.

Referring back again to FIG. 1, the input sleeve 104 may further include a third sleeve-portion 154 spaced apart from the second sleeve-portion 152 and a fourth sleeve-portion 156 spaced apart from the third sleeve-portion 154, such that the third sleeve-portion 154 is positioned between the second and fourth sleeve-portions 152, along the axial direction A. In this configuration, the contact portion 290 may be part of or independent from the fourth sleeve-portion 156.

The recess 180 may be of an axial dimension along the axial direction and a radial dimension along a radial direction, the axial dimension being greater than the radial dimension.

Referring back to FIG. 1 through FIG. 3, the cylinder housing 102 and the input sleeve 104 may each independently include or be formed of any suitable materials, with non-limiting examples thereof including aluminum, steel, and copper. In a non-limiting design where the input sleeve 104 is a steel shaft and the cylinder housing 102 is an aluminum sleeve, deformation or radial expansion of the aluminum sleeve may occur. To maintain a sealing press fit along the entire joint, radial diameters of the cylinder-portions 140, 142, 144 and 146 may be stepped in size, and yet the steps may be designed to be very small.

In one or more embodiments, the present invention as set forth herein is believed to have overcome certain challenges associated with metal debris accumulation during formation of an input clutch assembly. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An input clutch assembly, comprising:
   a cylinder housing, a cross-section thereof including along an axial direction first and second spaced apart cylinder-portions; and
   an input sleeve, a cross-section thereof including along the axial direction first and second sleeve-portions defining there-between a first sleeve-channel with a pair of edges spaced apart along the axial direction, the first sleeve-portion defining thereupon a recess;
   wherein at a first engagement position the recess is at least partially exposed while the pair of edges both contact the first cylinder-portion.

2. The input clutch assembly of claim 1, wherein the second sleeve-portion is of a second axial length along the axial direction and contacts the first cylinder-portion in more than half of the second axial length at the first engagement position.

3. The input clutch assembly of claim 1, wherein the first sleeve-portion includes a pair of shoulders abutting the recess and contacting the first cylinder portion at a second engagement position.

4. The input clutch assembly of claim 3, wherein the second sleeve-portion is spaced apart from the first cylinder-portion at the second engagement position.

5. The input clutch assembly of claim 3, wherein the pair of shoulders are relative to each other with a radial dimension difference of no greater than 0.24 millimeters.

6. The input clutch assembly of claim 1, wherein the cylinder housing further includes a stop extending radially toward a central axis, the second cylinder-portion being positioned between the stop and the first cylinder-portion along the axial direction.

7. The input clutch assembly of claim 6, wherein a contact portion of the input sleeve contacts the stop at a third engagement position, the second sleeve-portion being positioned between the contact portion and the first sleeve-portion along the axial direction.

8. The input clutch assembly of claim 6, wherein the cylinder housing further includes a third cylinder-portion spaced apart from the second cylinder-portion and a fourth cylinder-portion spaced apart from the third cylinder-portion, such that the third cylinder-portion is positioned between the second and fourth cylinder-portions along the axial direction, and the stop is part of the fourth cylinder-portion.

9. The input clutch assembly of claim 7, wherein the input sleeve further includes a third sleeve-portion spaced apart from the second sleeve-portion and a fourth sleeve-portion spaced apart from the third sleeve-portion, such that the third sleeve-portion is positioned between the second and fourth sleeve-portions along the axial direction, and the contact portion is part of the fourth sleeve-portion.

10. The input clutch assembly of claim 1, wherein the recess is of an axial dimension along the axial direction and a radial dimension along a radial direction, the axial dimension being greater than the radial dimension.

11. An input clutch assembly, comprising:
    a cylinder housing, a cross-section thereof including along an axial direction first, second, third and fourth sleeve-portions spaced apart from each other; and
    an input sleeve, a cross-section thereof including along the axial direction first, second, third and fourth sleeve-portions spaced apart from each other, the first and second sleeve-portions defining there-between a first sleeve-channel with a pair of edges spaced apart along the axial direction, the first sleeve-portion defining thereupon a recess;
    wherein at a first engagement position the recess is at least partially exposed while the pair of edges both contact the first sleeve-portion.

12. The input clutch assembly of claim 11, wherein the second sleeve-portion is of a second axial length along the axial direction and contacts the first sleeve-portion in more than half of the second axial length at the first engagement position.

13. The input clutch assembly of claim 11, wherein the first sleeve-portion includes a pair of shoulders abutting the recess and contacting the first sleeve portion at a second engagement position.

14. The input clutch assembly of claim 13, wherein the second sleeve-portion is spaced apart from the first cylinder-portion at the second engagement position.

15. The input clutch assembly of claim 11, wherein the fourth cylinder-portion further includes a stop extending radially toward a central axis, the third cylinder-portion being positioned between the stop and the second cylinder-portion along the axial direction.

16. The input clutch assembly of claim 15, wherein the fourth sleeve-portion further includes a contact portion to contact the stop at a third engagement position, the third sleeve-portion being positioned between the contact portion and the second sleeve-portion along the axial direction.

17. An input clutch assembly, comprising:
    a cylinder housing, a cross-section thereof including along an axial direction first and second spaced apart cylinder-portions; and
    an input sleeve, a cross-section thereof including along the axial direction first and second sleeve-portions defining there-between a first sleeve-channel with a pair of edges spaced apart along the axial direction, the first sleeve-portion defining thereupon a recess;
    wherein at a first engagement position the recess is at least partially exposed while the pair of edges both contact the first cylinder-portion, wherein the second sleeve-portion is of a second axial length along the axial direction and contacts the first cylinder-portion in more than half of the second axial length at the first engagement position, and wherein the first sleeve-portion includes a pair of shoulders abutting the recess and contacting the first cylinder portion at a second engagement position.

18. The input clutch assembly of claim 17, wherein the cylinder housing further includes a stop extending radially toward a central axis, the second cylinder-portion being positioned between the stop and the first cylinder-portion along the axial direction, and wherein a contact portion of the input sleeve contacts the stop at a third engagement position, the second sleeve-portion being positioned between the contact portion and the first sleeve-portion along the axial direction.

19. The input clutch assembly of claim 18, wherein the cylinder housing further includes a third cylinder-portion spaced apart from the second cylinder-portion and a fourth cylinder-portion spaced apart from the third cylinder-portion, such that the third cylinder-portion is positioned between the second and fourth cylinder-portions along the axial direction, and the stop is part of the fourth cylinder-portion.

20. The input clutch assembly of claim 19, wherein the input sleeve further includes a third sleeve-portion spaced apart from the second sleeve-portion and a fourth sleeve-portion spaced apart from the third sleeve-portion, such that the third sleeve-portion is positioned between the second and fourth sleeve-portions along the axial direction, and the contact portion is part of the fourth sleeve-portion.

* * * * *